(No Model.)

E. WARWICK.
METHOD OF MAKING HOLLOW WHEEL RIMS.

No. 506,753.  Patented Oct. 17, 1893.

WITNESSES:
John W. Achard
Thomas M. Smith

INVENTOR.
Edward Warwick,
BY J. Walter Douglass.
ATT'Y

UNITED STATES PATENT OFFICE.

EDWARD WARWICK, OF BIRMINGHAM, ENGLAND.

METHOD OF MAKING HOLLOW WHEEL-RIMS.

SPECIFICATION forming part of Letters Patent No. 506,753, dated October 17, 1893.

Application filed October 4, 1892. Serial No. 447,809. (No model.)

*To all whom it may concern:*

Be it known that I, EDWARD WARWICK, a subject of the Queen of England, residing at Aston, Birmingham, in the county of Warwick, England, have invented certain new and useful Improvements in Methods of Making Hollow Wheel-Rims, of which the following is a specification.

The principal object of my invention is to provide an expeditious, economical and efficient method of making a hollow or cushion wheel-rim adapted for use in connection with bicycles, tricycles and other vehicles.

My invention consists in the improvements hereinafter fully described and claimed.

The nature, objects and characteristic features of my invention will be more fully understood from the following description taken in connection with the accompanying drawings forming part hereof, and in which—

Figure 1:
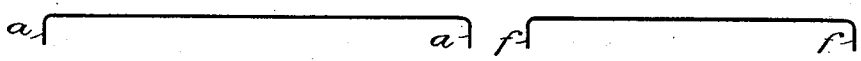
Figure 7:
Figure 2:
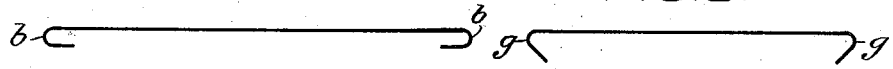
Figure 8:
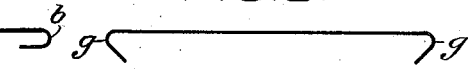
Figure 3:
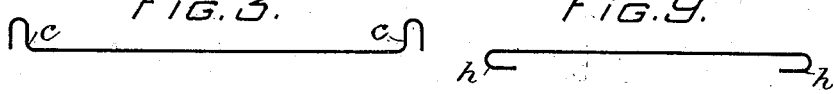
Figure 9:
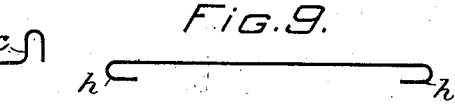
Figure 4:
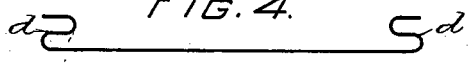
Figure 10:
Figure 5:
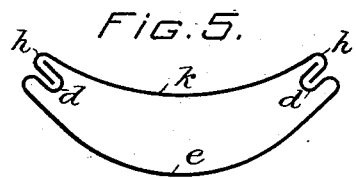
Figure 6:
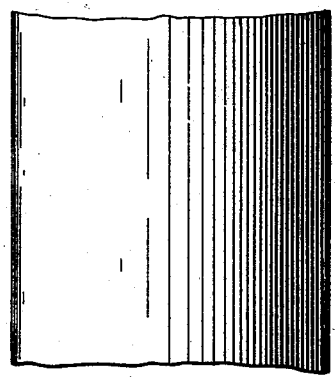

Figures 1, 2, 3 and 4, are sectional views representing successive steps in my improved method of making the blank that forms the tread or tire of the rim. Fig. 5, is a similar view representing another step in the formation of the tread or tire blank and also showing the felly or upper blank of the rim. Fig. 6, is a plan view of the under side of Fig. 5. Figs. 7, 8 and 9, are sectional views representing successive steps in my improved method of making the blank that forms the felly or upper portion of the rim; and Fig. 10, is a sectional view of a finished rim embodying features of my invention, and showing the edges of the two blanks compressed or consolidated together.

A wheel rim constructed in accordance with my invention comprises a concave tread or tire portion e, Fig. 5, provided with marginal seats d, and a narrower felly or upper portion k, provided with marginal flanges h, adapted to said seats, the construction being such that the concavity of the tread or tire portion e, exceeds the concavity of the felly or upper portion k, so that a space is afforded between the two in order to permit the tread or tire portion e, to yield and spring. An inspection of Figs. 5 and 10, will show that undue flattening of the component portions of the rim is resisted by the flanges h, which engage the seats d, in the same manner as a hook would do, so that the rim is exceedingly strong and may be made of thin spring action sheet metal. However, if preferred, the interlocking edges of the portions e and k, may be soldered or brazed together.

In carrying my improved method into practice for the production of a wheel rim embodying features of my invention, I make the tread or tire portion e, as follows: The margins or edges of a blank comprising a sheet of steel of any required length are turned down as at a, in Fig. 1, by passing the blank through suitable rolls or dies. The edges a, of the blank, are then folded over upon themselves, as shown at b, in Fig. 2, by passing the blank through another set of rolls or dies. The folded edges b, of the blank, are then turned upward as shown at c, in Fig. 3, by passing the blank through suitable rolls or dies. The turned up edges b, of the blank are then folded back upon themselves, as shown in Fig. 4, by passing the blank through suitable rolls or dies to form the seats d. The blank provided with the seats d, as shown in Fig. 4, is then passed through suitable rolls in order to render it concave as shown at e, in Fig. 5, whereby the tread or tire portion is completed.

In forming the upper or felly portion of the wheel rim I proceed as follows:—The margins or edges of a blank comprising a sheet of steel of the required length and somewhat narrower than the sheet employed in the production of the tread or tire blank, are turned down as shown at f, in Fig. 7, by passing the blank through suitable rolls. The turned down edges f, of the blank, are then partially folded upon themselves as shown at g, in Fig. 8. The partially folded edges f, are then completely folded, as shown in Fig. 9, to form the flanges h, by passing the blank through suitable rolls. The blank provided with the flanges h, as shown in Fig. 9, is then passed through suitable rolls in order to render it concave, as shown at k, in Fig. 5. The flanges h, are then fitted to their complemental seats d, as shown in Fig. 5, and the loosely united wheel rim is passed through suitable rolls or dies adapted to compress or consolidate the flanges and their complemental seats, as shown at n and m, in Fig. 10, thus forming a rigid hollow wheel rim especially adapted for use in connection with bicycles, tricycles and other vehicles. The two portions of the wheel rim are further secured together at *m* and *n*, by soldering or by brazing them.

Having thus described the nature and objects of my invention, what I claim as new, and desire to secure by Letters Patent, is—

The herein described mode of making a hollow wheel rim, which consists first, in making a concave tread or tire provided with marginal seats by turning down, folding over and bending the edges of a blank to form said seats and then off-setting the center portion of said blank, second, in making a felly of similar and less concavity and provided with hook-like marginal flanges by striking up and bending the side portions of a narrower blank to form the marginal flanges and then off setting the center of the second blank to a curve of less radius than the first blank, and third, uniting the felly and head by springing the flanges into the seats and consolidating them, substantially as and for the purposes set forth.

In testimony whereof I have hereunder signed my name in the presence of two subscribing witnesses.

EDWARD WARWICK.

Witnesses:
ALFRED WILLIAM TURNER,
ISAAC MARKS.